Patented Nov. 10, 1931

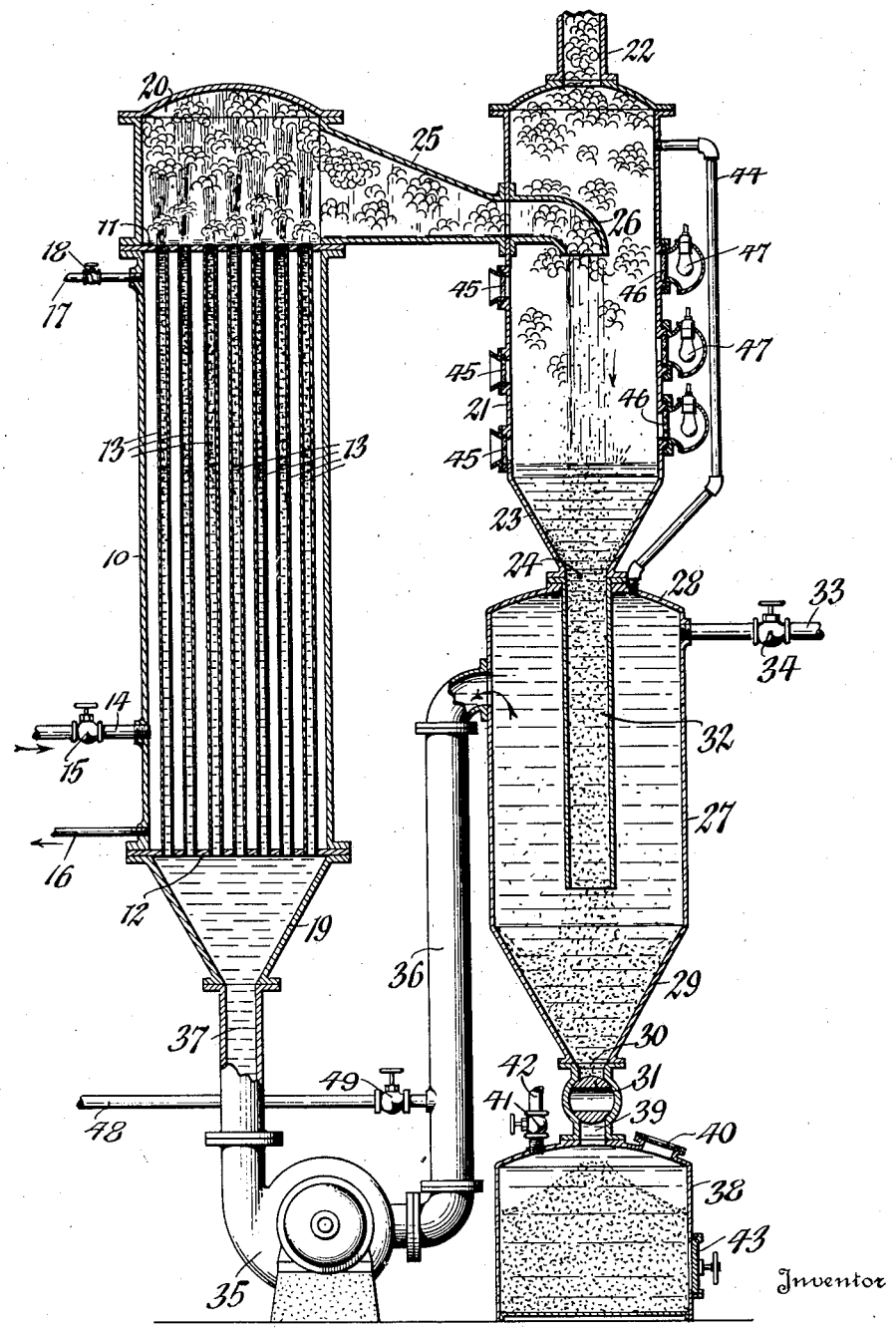

1,831,121

UNITED STATES PATENT OFFICE

MARTIN J. KERMER, OF SNYDER, NEW YORK, ASSIGNOR TO BUFFALO FOUNDRY & MACHINE COMPANY, OF BUFFALO, NEW YORK, A CORPORATION OF NEW YORK

EVAPORATING APPARATUS

Application filed January 23, 1930. Serial No. 422,770.

This invention relates to an evaporating apparatus which is more particularly designed for concentrating liquids which, during evaporation, precipitate salt crystals, such for example as caustic solution in which floating salt formed during concentration has been difficult to remove.

It is the object of this invention to provide an efficient apparatus whereby the salt formed during concentration of the solution is readily separated from the liquor and removed from the apparatus while the liquor is continued in circulation through the apparatus for further concentration and precipitation of salt crystals therein in a manner which is expeditious and economical in heat consumption and expenditure of labor.

The accompanying drawing is a vertical section of one form of evaporating apparatus embodying my invention, but it is to be understood that the same may be modified in various respects and still contain the essence of my improvements.

In its general organization this evaporating apparatus comprises means for heating the liquid solution and dividing the same into vapor, clear liquid and salt crystals, vapor separating means whereby the vapor is separated from the clear liquid and the salt crystals, crystal separating means whereby the salt crystals are separated from the clear liquid, means for returning the clear liquid from the crystal separating means to the inlet of the heater, and means for receiving the salt crystals from the crystal separating means.

The means for heating the liquid solution may be variously organized but as shown in the drawing, the same preferably consists of a steam chest comprising an upright enclosing casing 10 provided at its upper and lower ends with tube sheets 11, 12, a plurality of upright tubes 13 arranged in the form of a cluster within the casing 10 and secured at their upper and lower ends in the upper and lower tube sheets, a supply pipe 14 communicating with the casing 10 at a point between its upper and lower ends and adapted to supply steam or any other suitable heating medium from any available source and provided with a valve 15 for controlling this pipe, a condensate outlet pipe 16 connected with the lower end of the casing 10 and a vent pipe 17 connected with the upper end of the casing 10 and provided with a valve 18 whereby any air present in the upper end of the casing 10 may be discharged in order to expose the full area of the heating tube 13 to the heating medium which is introduced into this casing.

The lower ends of the heating tubes 10 open into a downwardly tapering or conical inlet chamber 19 which receives the liquid to be concentrated from any suitable source. This liquid is forced from the inlet chamber 19 upwardly into the heating tubes 13, and while this liquid is in these tubes the same is heated rapidly by the heat of the steam or other heating medium in the casing 10 and discharged at a high velocity into an upper chamber or dome 20 arranged above the casing 10 and communicating with the upper ends of the tubes 13. As the liquid mixture is discharged from the upper ends of the tubes into the dome, the same divides into vapor, clear liquid and salt crystals, and these are first conducted to the means whereby the vapor is separated from the clear liquid and salt crystals. This vapor separating means in its preferred form comprises an upright separating chamber 21 arranged adjacent to the upper part of the heating chest and is provided at its upper end with a vapor outlet 22 and at its lower end with a downwardly tapering or conical bottom portion 23 which contains an outlet 24 for the clear liquid and salt crystals. The vapor, clear liquid and salt crystals are conducted from the dome 20 of the heater to the upper part of the vapor separating means by a horizontal pipe 25 having an enlarged inlet and communicating with the side of the dome 20 so as to receive the vapor, clear liquid and salt crystals therefrom, and having a reduced outlet end which communicates with a downwardly turned discharge nozzle 26 arranged within the vapor separating chamber 21 between the upper and lower ends thereof and adapted to discharge the vapor, clear liquid and salt crystals downwardly in the central part of this vapor separating chamber.

As these elements are delivered into the vapor separating chamber by the nozzle 26 the vapor separates from the liquid and salt crystals and passes from the lower end of the nozzle upwardly in the separating chamber 21 and out through the vapor outlet 22, which latter may lead either to a condenser or other means for producing a vacuum, or the same may be coupled with another evaporator for producing a multiple effect. The liquid and salt crystals issuing from the nozzle 26 drop to the bottom of the separating chamber 21 and are delivered to the means whereby the salt crystals are separated from the liquid, which means in their preferred form are constructed as follows:

The numeral 27 represents an upright crystal separating or settling chamber which is arranged below the vapor separating chamber and provided with an upper head 28 and a downwardly tapering or conical bottom 29. The outlet 30 at the lower end of the conical bottom 29 is controlled by a valve 31 of any suitable construction, and the interior of the crystal separating chamber 27 communicates with the interior of the vapor separating chamber 21 by a downtake tube 32 extending from the lower outlet 24 of the vapor separator downwardly through the upper head 28 of the crystal separator and into the central part of the latter adjacent to the conical bottom 29 thereof.

The mixture of clear liquid and salt crystals is conducted by the tube 32 downwardly from the lower end of the vapor separating chamber into the lower part of the crystal separating chamber 27, and as these elements issue from the lower end of the tube 32 the salt crystals drop slowly to the bottom of the crystal separating chamber while the clear liquid rises slowly toward the top of this chamber from the lower end of the tube 32 into the upper end of the chamber 27 thereby effecting a separation of the clear liquid from the salt crystals.

Some of the clear liquid may be removed from the upper end of the crystal separating chamber 27 through a pipe 33 which either leads to a proceeding effect or may be removed by a pump, in the case of a single effect evaporator, or may be otherwise disposed of, this pipe being provided with a valve 34 for controlling the discharge of clear liquid at this point.

The clear liquid which is to be subjected to a further evaporating effect in this same apparatus is withdrawn from the upper part of the crystal separating chamber 27 and conducted to the lower end of the tubes 13 where it is forced upwardly through the same, and thereby effect a re-circulation of this liquid in the apparatus. This is preferably accomplished by means of a pump 35 having its inlet side connected by means of a pipe 36 with the upper part of the crystal separating chamber 27 while its outlet side is connected by means of a pipe 37 with the lower end of the inlet chamber 19 which communicates with the lower end of the heating tubes 13.

When this apparatus is in operation the pump 35 serves to withdraw the clear liquid from the upper end of the crystal separating chamber 27 and force the same upwardly through the heating tubes 13 so as to rapidly circulate the clear liquid in the apparatus and concentrate the same as much as desired before discharging the same from the apparatus through the discharge pipe 33.

The salt crystals may be removed from the apparatus either intermittently or continuously in any well-known or approved manner, and the means for this purpose shown in the drawing are therefore to be taken as merely typical of one way in which this can be satisfactorily accomplished. As there shown, these salt crystal removing means include a receiving chamber 38 having an inlet 39 at its upper end, which may be connected with or disconnected from the outlet of the crystal separating chamber 27 by means of the valve 31. When this valve is open clear liquid and crystals are free to flow from the separating chamber 27 into the receiving chamber 38 while the interior of the latter is subjected to the same vacuum which operates upon the interior of the vapor separating chamber 21 and the crystal separating chamber 27. As the salt crystals accumulate in the receiving chamber 38 the clear liquid is displaced above the same into the crystal separating chamber 27, and when the desired quantity of salt crystals have accumulated in the receiving chamber 38 the latter may be cut off from the crystal separating chamber by closing the valve 31.

The progress of filling the chamber 38 more or less with crystals may be observed by the attendant through an observation window 40 preferably mounted on the top of this chamber. After the receiving chamber 38 has been cut off from the crystal separating chamber 27 the vacuum within the receiving chamber 38 may be broken by opening a vent valve 41 arranged in the vent pipe 42 communicating with the upper part of the receiving chamber after which the salt crystals and any clear liquid in this chamber may be removed therefrom through an opening in this chamber which is normally closed by a door 43, and transferred by a salt pump or otherwise to a filter, drier or separator, or disposed of in any other suitable manner.

In order to prevent the apparatus from becoming air-bound by the formation of an air pocket or air lock at the upper end of the crystal separating chamber 27, a vent pipe 44 is provided which extends from the uppermost part of the chamber 27 to the upper part of the vapor separating chamber 21, thereby permitting the air to escape to the upper part of the chamber 21 during the starting of the apparatus and thereby prevent the crystal separating chamber from becoming airbound as above described.

In order to permit the attendant to observe the operation of separating the vapor from the liquid and salt crystals within the separating chamber 21, one side of the upright wall of the latter is provided with a vertical row of observation windows 45 and the opposite side of the wall of this chamber is provided with a similar row of illuminating windows 46. The outer side of each of the last-mentioned windows is preferably provided with a lamp 47 whereby the operator on looking inwardly through one or other of the windows 45, may observe the operation of the apparatus and govern the regulation of the same accordingly.

In order to compensate for the removal of vapor, clear liquid and crystals during the operation of the apparatus, fresh or raw liquid is introduced by means of a pipe 48 which may connect with the inlet side of the pump and provided with a regulating valve 49, as shown in the drawing, or this fresh solution may be introduced at any other suitable point of the conduit for the liquid between the crystal separating chamber 27 and the inlet chamber 19 at the lower end of the heating tubes 13.

By means of this apparatus it is possible to concentrate liquid solutions such for example as electrolytic caustic soda which is difficult to handle due to the formation of a salt. This salt is formed in the present apparatus on the surface of the liquid level in the "catch-all" or vapor separating chamber 21 and is finally loaded with the fine crystals or salt in the lower part of the vapor separating chamber 21 and forced with the same downwardly through the pipe 32 into the crystal separating chamber 27 where the salt crystals and the salt drop to the bottom of this crystal separating chamber and are drawn off into the receiving chamber 38, and thereby permits withdrawing only clear liquid from the uper part of the crystal separating chamber 27 and returning this clear liquor to the heater for again subjecting the same to an evaporating operation.

If the apparatus is to be used to produce salt crystals in batches the valve controlled outlet at the lower end of the salt crystal separating chamber 27 may be connected with a salt basket of any suitable construction, and if desired the salt crystals may be removed continuously by means of a conveyor mechanism of any suitable and well-known character.

I claim as my invention:

An evaporating apparatus comprising a heating chest provided with tubes for the passage of the liquid solution to be concentrated and a jacket enclosing said tubes and adapted to receive a heating medium; a dome which receives the heated liquid, vapor and crystals from the upper ends of said tubes, a vapor separating chamber having a vapor outlet in its upper part, a liquid vapor and crystal conducting pipe having one end communicating with said dome and having its other end projecting downwardly in said vapor separating chamber between the upper and lower ends of the latter; a settling chamber arranged below said vapor separating chamber and provided at its lower end with a valved outlet; a crystal and liquor pipe extending from the lower end of said vapor separating chamber downwardly into said settling chamber; means for withdrawing liquid solution from the upper part of said settling chamber and introducing the same into the lower ends of said tubes of the heating chest and a vent pipe connecting the upper parts of said settling chamber and vapor separating chamber.

In testimony whereof I hereby affix my signature.

MARTIN J. KERMER.